No. 614,992. Patented Nov. 29, 1898.
M. SCHMIDT.
AIR ENGINE.
(Application filed Sept. 1, 1897.)
(No Model.) 2 Sheets—Sheet 1.
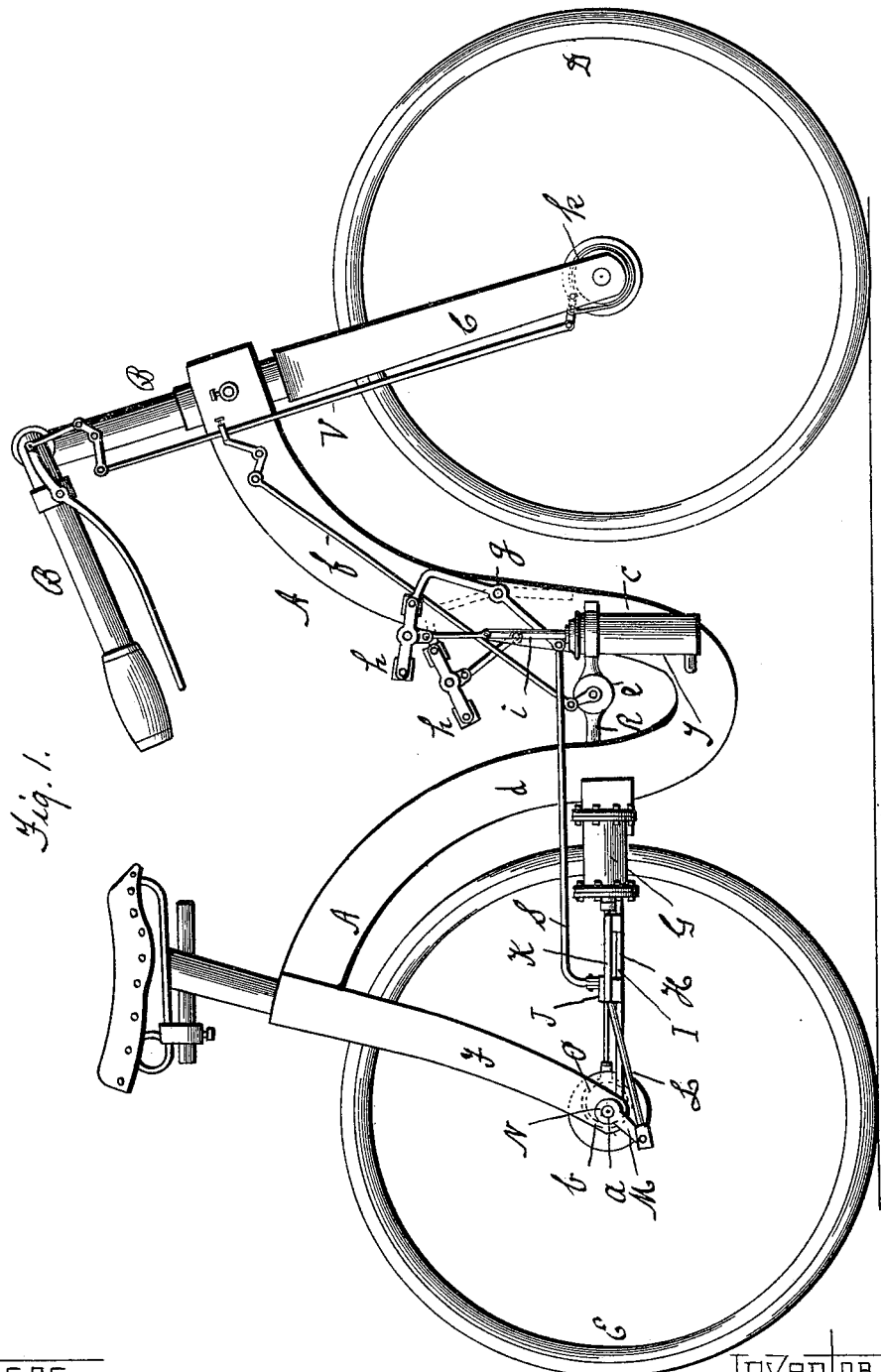
Witnesses
R. F. S. Heath
James F. Gannon
Inventor
Michael Schmidt
by Francis D. Pastorius
Atty.

No. 614,992. Patented Nov. 29, 1898.
M. SCHMIDT.
AIR ENGINE.
(Application filed Sept. 1, 1897.)
(No Model.) 2 Sheets—Sheet 2.
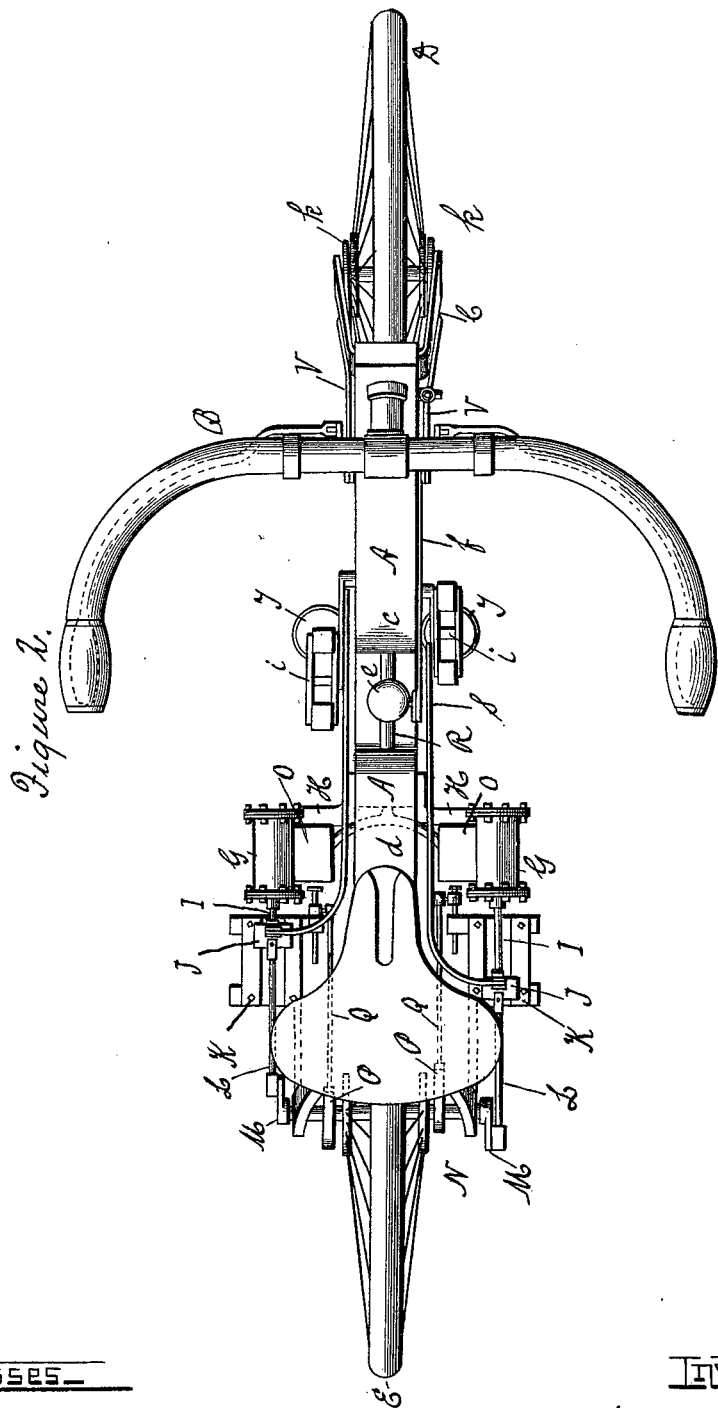
Witnesses
R F S Heath
James F. Gannon
Inventor
Michael Schmidt
by Francis D. Pastorius
atty.

UNITED STATES PATENT OFFICE.

MICHAEL SCHMIDT, OF CRAMER'S HILL, NEW JERSEY.

AIR-ENGINE.

SPECIFICATION forming part of Letters Patent No. 614,992, dated November 29, 1898.

Application filed September 1, 1897. Serial No. 650,311. (No model.)

*To all whom it may concern:*

Be it known that I, MICHAEL SCHMIDT, a citizen of the United States, residing at Cramer's Hill, in the county of Camden and State of New Jersey, have invented a new and useful Improvement in Bicycles, of which the following is a specification.

The invention is designed for operating a bicycle by means of air compressed by the running of the machine. The bicycle-frame is preferably U-shaped and hollow to form a compressed-air reservoir and has the usual handle-post and fork for the front wheel and the hind or driving wheel in bearings of the hollow frame. An engine or motor, together with an air-compression pump, are in duplicate and placed at each side of the machine, the cranks being at right angles.

On reference to the accompanying sheet of drawings, making part of this specification, Figure 1 is a side elevation, and Fig. 2 is a plan view.

Similar letters refer to similar parts in both views.

A is a U-shaped compressed-air reservoir which forms the frame of the machine. It is provided with the usual handle-bar and post B and the fork C for the front wheel D.

E is the hind or driving wheel in bearings $a$ at the bottom end $b$ of the depending leg F of said frame.

G is a motor-cylinder on a bed of the plate H, extending from the leg F to the bottom or bend $c$ of the U. Its piston-rod I connects with its cross-head J in guides K, and its connecting-rod L joins the cross-head J and a crank M on the shaft N of the hind wheel E. The compressed-air chest O has its valve operated from an eccentric P on the hind wheel E by a rod Q. The connection between the U and the compressed-air chest O of the cylinder G is by a pipe R, extending from the front leg $c$ through the opposite leg $d$ and controlled by a cock $e$, operated by a rod $f$, leading from the handle-bar B.

S is a connecting-rod which is fixed to the cross-head J and pivoted at its opposite end with that end of a lever in turn pivoted to the frame at $g$ and jointed or otherwise attached to the foot-pedal $j$, which is pivoted on the top end of the plunger $i$ of an air-pump T, fixed to the side of the frame at the U-bend.

V is a brake-rod between the handle-bar B and a brake-wheel $k$ of the axle of the front wheel D.

The operation is as follows: The pressure of the feet of the rider on the pedals $j$ causes a reciprocation of the rod S and the cross-head J and at the same time reciprocates the plunger $i$ of the air-pump T for compressing air in the U-shaped pneumatic reservoir. During this operation the cock $e$ is closed by the rod $f$ from the handle-bar B until the air is sufficiently compressed for reciprocating the piston of the engine or motor and driving the machine. The continuous motion of the pedals keeps up a continuous air compression in the frame A.

I claim—

In a bicycle, the combination of a hollow U-shaped frame, a pipe connecting with the bottom bend of the U-shaped frame, an air-chest on each side of the frame and connected with the bottom bend of the frame by said pipe, a shut-off cock in said pipe, air-cylinders and piston connections to the bicycle-wheel, eccentrics on the wheel-shaft for actuating the valves of the air-chest, an air-pump for each air-cylinder on opposite sides of the U-shaped frame, a plunger for each pump, and a treadle on each plunger, as shown and described.

In testimony whereof I affix my signature in presence of two witnesses.

MICHAEL SCHMIDT.

Witnesses:
FRANCIS D. PASTORIUS,
B. D. ARCHER.